(12) United States Patent
Hale et al.

(10) Patent No.: US 6,920,389 B1
(45) Date of Patent: Jul. 19, 2005

(54) IGNITION SYSTEM

(75) Inventors: Howard Stanley Hale, Canal Fulton, OH (US); Elaine Elizabeth Futrell, Clinton, OH (US)

(73) Assignee: Elaine E. Futrell, Akron, OH (US)

( * ) Notice: Subject to any disclaimer, the term of this patent is extended or adjusted under 35 U.S.C. 154(b) by 0 days.

(21) Appl. No.: 10/922,212

(22) Filed: Aug. 19, 2004

Related U.S. Application Data

(60) Provisional application No. 60/584,223, filed on Jun. 30, 2004.

(51) Int. Cl.[7] .............................................. G06F 19/00
(52) U.S. Cl. ...................... 701/115; 340/425.5; 701/112
(58) Field of Search ......................... 701/115, 102, 112; 340/425.5

(56) References Cited

U.S. PATENT DOCUMENTS

| | | | | |
|---|---|---|---|---|
| 3,810,089 A | * | 5/1974 | Florence et al. | 340/425.5 |
| 4,641,722 A | * | 2/1987 | Bluvstein | 180/271 |
| 4,723,625 A | * | 2/1988 | Komlos | 180/272 |
| 5,465,079 A | * | 11/1995 | Bouchard et al. | 340/576 |
| 5,798,695 A | * | 8/1998 | Metalis et al. | 340/576 |
| 5,811,947 A | * | 9/1998 | Hurst et al. | 318/370 |
| 6,501,370 B1 | * | 12/2002 | Rick | 340/425.5 |

* cited by examiner

Primary Examiner—Hieu T. Vo
(74) Attorney, Agent, or Firm—Marcella R. Louke

(57) ABSTRACT

System and method for preventing unauthorized or impaired operation of a motor vehicle by requiring a potential operator to sequentially energize several vehicle devices, within a set time period, prior to placing the vehicle ignition into a start position. The system includes a sequencing mechanism comprising an array of J-K flip-flops in a daisy chain configuration and an R-C timer mechanism. Logic outputs from the sequencing mechanism and the timer mechanism are fed to a NAND gate operating as a logic decoder that is used to control the vehicle ignition circuit. Only if all the inputs to the logic decoder are "go" will the output signal allow the ignition circuit to close. A sensory indicator may alert the potential operator as to the condition of the decoder output. An unauthorized user is inhibited from operating the motor vehicle because the performance sequence is unknown to him/her. Slower reflex times or impaired motor skills may prevent an impaired operator from performing the proper sequence within the predetermined time period.

20 Claims, 6 Drawing Sheets

IGNITION SYSTEM

This application claims the benefit of a Provisional Patent Application No. 60/584,223 filed Jun. 30, 2004 entitled: IGNITION SYSTEM.

BACKGROUND OF THE INVENTION

1. Field of the Invention

The present invention relates to systems, devices, and methods for inhibiting unauthorized persons from operating a motor vehicle. Additionally, the invention provides systems, devices, and methods for inhibiting potential operators who may be impaired, for example by drug use or alcohol consumption, from operating a motor vehicle.

2. Description of the Related Art

Various systems and devices have been developed to prevent unauthorized use of a vehicle. Additionally, systems and devices have been developed to inhibit operation of a motorized vehicle by a driver impaired particularly through consumption of excessive alcohol, legal or illegal drugs, and/or sleep deprivation.

For example, U.S. Pat. No. 4,723,625 discloses a sobriety-testing device that tests the reflexes of a potential operator before permitting the engine of the motor vehicle to be started. Purportedly, the engine is disabled if the operator's reflexes are substantially below a previously determined norm. The disclosed sobriety-testing device includes a hand-held unit having a base position button, as well as left and right test buttons.

U.S. Pat. No. 5,465,079 discloses a method and apparatus for evaluating a driver's performance under actual real-time driving conditions. The disclosed method and apparatus compares information gathered by a radar system and other sensors with driver-related information previously stored in an event recording device.

U.S. Pat. No. 5,798,695 discloses an impaired operator detection and warning system. Purportedly, the system characterizes operator control actions as a complex sine wave and uses a power spectrum array analysis to predict the level of operator alertness in real-time.

U.S. Pat. No. 6,501,370 discloses a vehicle anti-theft lock apparatus and method including a code box that must be accessed to enable the vehicle to operate. The apparatus purportedly locks the steering column, the gearshift lever, and the front and rear brakes. Further, the apparatus purportedly disables the vehicle electrical system.

3. Objects and Advantages

None of these references provide a simple system to deter unauthorized/impaired use of a motor vehicle that utilizes input from the vehicle's functional devices.

The present invention provides a simple, but effective system for inhibiting unauthorized or impaired operation of a motor vehicle; yet one which is simple for an authorized, uninhibited operator to engage.

It is therefore an object of the invention to provide a system, engaged with a vehicle electrical system, which requires a potential operator to perform a plurality of vehicle functions, in a predetermined sequence, before the vehicle ignition can be engaged. The predetermined sequence of vehicle functions must further be performed within a specified time period, or the vehicle ignition will not engage.

It is a further object of the invention to provide a delay circuit to decrease system malfunction by random attempts to engage the vehicle ignition system.

It is a further object of the invention to provide a method for engaging the ignition of a vehicle. The method includes the step of providing a system, engaged with the vehicle electrical system, which requires a potential operator to perform a plurality of vehicle functions in a predetermined sequence, within a specified time period. The method further includes the steps of a potential operator resetting the system to an operational mode, and performing a plurality of vehicle functions in a predetermined sequence, within a specified time period.

It is a further object of the invention to provide electronic circuitry, engaged with a vehicle electrical system, wherein the electronic circuitry interrupts the vehicle start relay signal to prevent engagement of a vehicle ignition unless a plurality of vehicle functions are performed in a predetermined sequence within a specified time period.

One advantage of the present invention is the inhibition of operation of a motor vehicle by an unauthorized user. The system acts as a theft deterrent because it would be difficult for an unauthorized user to start the vehicle without knowing the proper functions and the proper sequence.

Another advantage of the present invention is the inhibition of operation of a motor vehicle by an operator whose motor skills are diminished due to excessive alcohol consumption or drug use. If the timing function "maxes out" before the proper sequence is performed, the vehicle ignition system is prevented from engaging. Thus, although a sober operator can readily perform the proper sequence, an impaired operator with slower reaction time would have difficulty in providing a valid performance.

Another advantage of the present invention is that the inventive system may be adapted to be retrofit on existing vehicles.

Another advantage of the present invention is that the inventive system may be adapted to a variety of motor vehicles, not merely automobiles. For example, the inventive system may be used in connection with boats, airplanes, and mass transit systems.

Another advantage of the present invention is that the inventive system may be incorporated as original equipment in new vehicles.

Another advantage of the present invention is that the inventive system may be utilized by law enforcement agencies as part of driver restriction/monitoring programs.

Still other advantages of the present invention will be readily appreciated by those having skill in the art.

SUMMARY OF THE INVENTION

The present invention is directed to a system and device that operates not only as an anti-theft device, but also as an ignition interlock system to inhibit operation of a motorized vehicle by a driver impaired by use of alcohol or drugs.

The disclosed system requires a potential operator to energize a series of vehicle function devices in sequence and within a specified amount of time. If the potential operator fails, the car will not start. Generally, the vehicle function devices include devices that are engaged with the vehicle's electrical system.

For example, the vehicle function devices can include turn signals (right and/or left), parking lights, headlights; glove compartment light, make-up mirror light, emergency flashers, horn, brake pedal light, seat belt use indicator, etc. Essentially any feature engaged with a vehicle's electrical system that is readily accessible by a potential operator could be utilized.

A potential operator must cause the pre-selected vehicle function devices to be energized, for example, by turning on a turn signal, tapping the brake, flipping open a mirror, etc.

The inventive system interrupts the electrical circuit from the vehicle electrical source or battery to each of the pre-selected vehicle function devices. Output signals generated from the devices, when energized, are utilized as function inputs to the inventive system. The pre-selected vehicle function devices, the number of devices chosen, the required sequence of operation and the time allotted for performance are all parameters which can be altered within the scope of the present invention.

Thus, in accordance with one embodiment of the invention, there is provided a system operable to interrupt the circuits that connect a plurality of vehicle function devices with vehicle energy source or battery. Further, the system is operable to interrupt the vehicle ignition circuit. In order for the vehicle ignition circuit to be completed, and therefore allow the vehicle ignition to engage when placed in the "start" position, a potential operator must energize each of the plurality of vehicle function devices, in a predetermined sequence, within a predetermined time period.

The exemplary system includes a reset mechanism operable to initialize a plurality of system mechanisms. The system further includes a sequencing mechanism operable to receive logic inputs from each of a plurality of vehicle function devices when the vehicle function device is energized. The sequencing mechanism being operable to generate a plurality of function outputs, wherein each of the function outputs are in a predetermined "go" logic condition only if each of the plurality of vehicle function devices are energized according to a predetermined sequence. The sequencing mechanism may be in operable connection with the reset mechanism.

The system further includes a timing mechanism operable to selectively provide a timing output in a predetermined "go" logic condition for a predetermined time period. The timing mechanism may be in operable connection with the reset mechanism.

The system further includes a gate mechanism operable to selectively generate an ignition output responsive to each of the generated function outputs and the timing output. The ignition output is in a predetermined logic "go" condition only if each of the plurality of function outputs and the timing output are in the predetermined logic "go" condition.

The inventive system may include a delay mechanism to delay an electrical signal from the vehicle electrical source or battery. It has been found that use of a delay mechanism inhibits noise from adjacent wires from inadvertently providing an undesired outcome.

The inventive system may also include sensory indicator means, such as a plurality of LEDs to provide a potential operator with information regarding the condition of the system.

The inventive system comprises a sequencing mechanism that utilizes a "daisy-chain" configuration of J-K flip-flops. If the vehicle function devices are energized according to the predetermined sequence, then the output channels will all be in a predetermined logic condition, herein defined as a "go" condition.

The logic outputs associated with the vehicle function devices are sent to a gate mechanism. Additionally, an output from a timer mechanism is sent to the gate mechanism. The timer mechanism may be of the type known in the art that utilizes the relationship between a resistor and a capacitor to provide a completed circuit for a pre-selected period of time.

The gate mechanism is preferably a NAND gate. If each input to the gate mechanism is in a logic "go" condition, then the output from the gate mechanism will be in a predetermined logic condition, herein defined as a logic "go" condition. The gate mechanism is operable to selectively control the vehicle ignition start-relay.

The gate mechanism is further operable to selectively control the sensory indicator means. If the output from the gate mechanism is in a logic "no-go" condition, herein defined as the logic condition opposed to the "go" condition, a first, preferably red, LED is illuminated to indicate to a potential operator that the vehicle ignition cannot be engaged. If the output from the gate mechanism is in a logic "go" condition, a second, preferably green, LED is illuminated to indicate to a potential operator that the vehicle ignition may be engaged.

The present invention is also directed to a method of inhibiting an unauthorized potential operator from causing a vehicle ignition circuit to close. The method includes the step of providing a system in electrical communication with a plurality of vehicle function devices and a vehicle ignition circuit. The system is operable to prevent the vehicle ignition circuit from closing unless a potential operator causes each of the plurality of vehicle function devices to be energized, in a predetermined sequence, within a predetermined time period.

REFERENCE NUMBERS

10-system
14-buffer filter or mechanism
18-reset mechanism
22-delay mechanism
26-vehicle electrical source or battery
30-run/start position of vehicle ignition
34-sequencing mechanism
38-timer mechanism
42-decoder logic or gate mechanism
46-sensory indicator mechanism
50-first light emitting diode (LED) (red)
54-second LED (green)
62-start position of vehicle ignition
64-delay mechanism sub-circuit
68-vehicle ignition start relay
70-off position of vehicle ignition
80-inhibit sub-circuit
84-jumper connection
88-shut-down sub-circuit
92-long-term timer
98-memory time set
110-identifier mechanism
A-output channel from first vehicle function device
B-output channel from second vehicle function device
C-output channel from third vehicle function device
D-output channel from fourth vehicle function device
E-output channel from fifth vehicle function device J1/P1-connectors at the interface of the vehicle function devices with the system J2/P2-connectors at the interface of the vehicle ignition circuit and the system

DETAILED DESCRIPTION

Operation of the Invention

Figure 1:
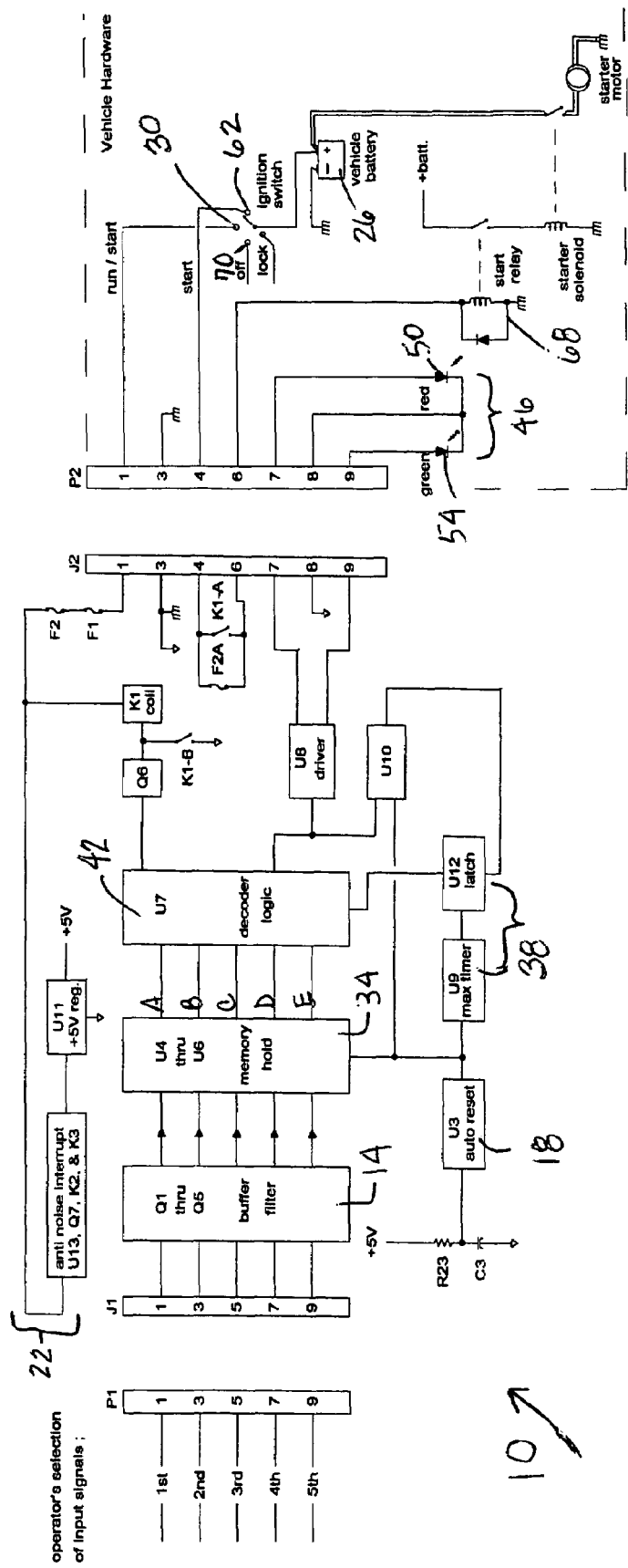
FIG. 1 shows a block diagram of an exemplary circuit according to the present invention.

With reference to the accompanying drawings, FIG. 1 depicts a block diagram of an exemplary system 10. In a preferred embodiment, the system 10 includes a buffer filter or buffer mechanism 14 generally operable to convert an initial vehicle voltage, i.e. 12 volts, into a voltage useable by the system 10, i.e. 5 volts. A reset mechanism 18 operates to reset or initialize the system mechanisms. The preferred system 10 further includes a delay mechanism 22. In the preferred embodiment, delay mechanism 22 generally operates as an anti-noise interrupt mechanism. Delay mechanism 22 delays the electrical signal from the vehicle electrical source, or battery 26, when the vehicle ignition is placed in a run/start position 30.

System 10 includes a sequencing mechanism 34 generally operable to receive inputs from a plurality of pre-selected vehicle function devices as will be explained in further detail below. In a preferred embodiment, system 10 also includes a timer mechanism 38. System 10 further includes a decoder logic or gate mechanism 42 generally operable to receive, as inputs, the logic outputs from sequencing mechanism 34 and timer mechanism 38. Timer mechanism 34 preferably includes a timer designated U9 and a latch mechanism U12.

In a preferred embodiment, system 10 further includes a sensory indicator mechanism 46 operable to provide a potential vehicle operator with sensory information about a condition of system 10. In the preferred embodiment, the sensory indicator mechanism 46 includes first LED 50 and second LED 54, preferably operable to emit different colors. First LED 50 is preferably operable to illuminate when system 10 is ready to receive input from a potential operator, after the vehicle ignition is placed in the "run/start" position 30. More preferably, first LED 50 illuminates after operation of the delay mechanism 22. Second LED 54 is preferably operable to illuminate when the vehicle ignition system is in an operable condition.

In an exemplary system, first LED 50 emits red light, to indicate that system 10 is ready to receive input from the pre-selected vehicle function devices and the timer output is in the logic "go" condition. In the exemplary system, second LED 54 emits green light, to indicate that the vehicle ignition may be engaged if placed in the "start" position 62.

System 10 is adapted to interface with a vehicle electrical system, particularly the ignition circuit, via connectors J2, P2. System 10 is further adapted to interface with a plurality of vehicle function devices via connectors J1, P1. In the preferred embodiment, the system 10 is energized when the vehicle ignition is placed in the run/start position 30.

Figure 2:
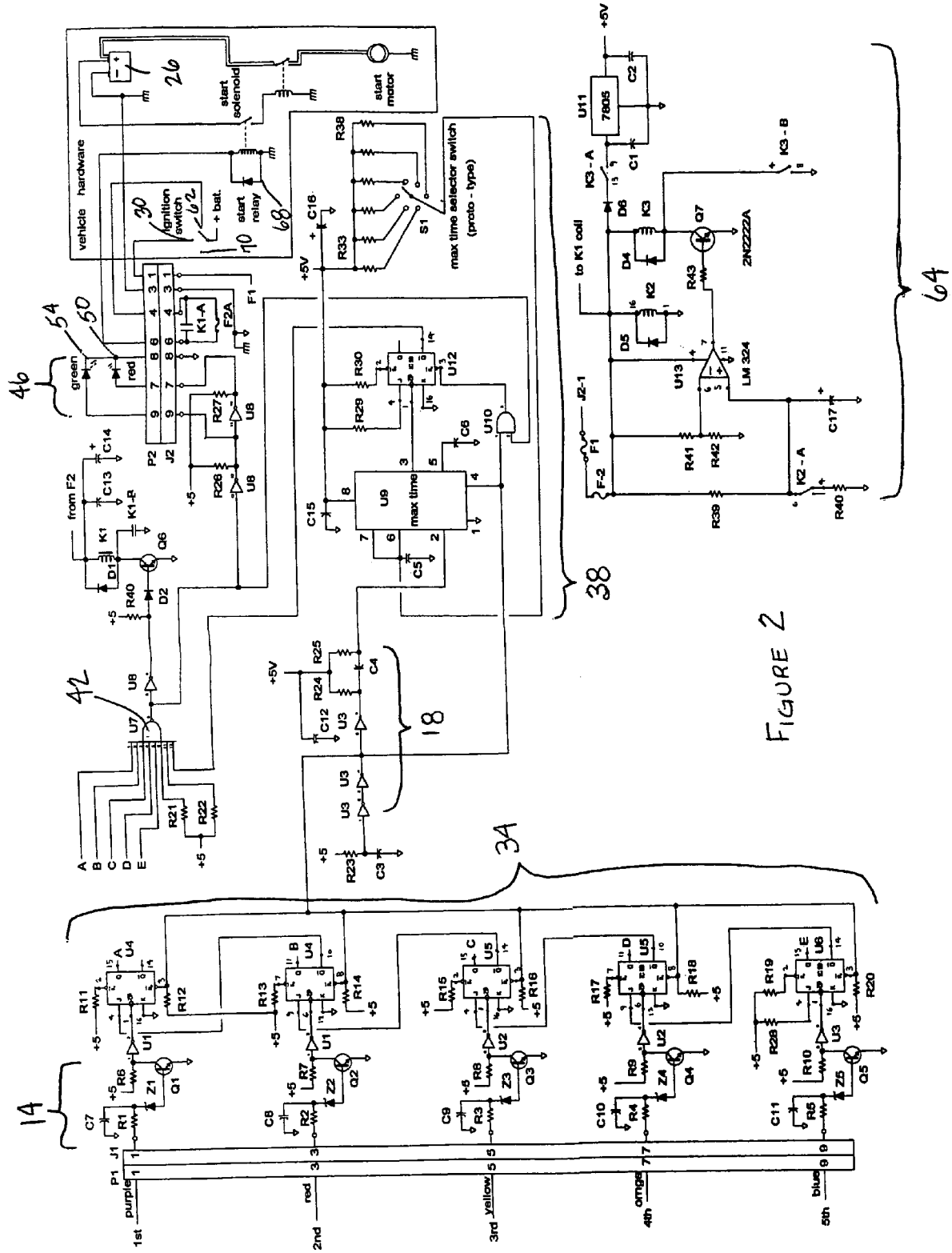
FIG. 2 shows a detailed system schematic of an exemplary circuit according to the present invention.

With particular reference to FIG. 2, a schematic representation of system 10 is provided. With the key in the ignition, a potential operator must turn the ignition key to the Run/Start position 30. The input on J2-1 is the 12V power from the vehicle energy source or battery 26 when the ignition switch is in a Run/Start position 30. As illustrated by a sub-circuit, designated generally by 64, block U11 converts the +12V down to a useable voltage (i.e. +5V) to be utilized by the TTL logic family mounted on the unit's circuit board. Relay K1 is controlled by transistor Q1. In turn, contact K1-A closes when K1 is energized causing a completed circuit to the vehicle start relay 68. System 10 is thus operable to selectively control relay K1.

In this exemplary embodiment, system 10 is adapted to interface with five (5) pre-selected vehicle function devices. Each vehicle function device is operable to be engaged, directly or indirectly, with the vehicle electrical system. For example, the vehicle function devices discussed in connection with this exemplary embodiment include left turn signal (LT); foot brake light (FB); parking light (PL); right turn signal (RT); back up light (BL). It is contemplated within the scope of the present invention to select a greater or lesser number of vehicle function devices. Generally, any vehicle function device that is engaged with the vehicle electrical system, and readily accessible to a potential operator, can be selected. It is within the scope of the present invention to select other vehicle function devices such as the light in a glove compartment, a seatbelt mechanism, a make-up mirror light, emergency flashers, and the like.

In the preferred embodiment, each pre-selected vehicle function device, when acted upon by a potential operator, and thereby energized by the vehicle electrical system, provides input to buffer mechanism 14. Buffer mechanism 14 converts the input signals to a lower amplitude and filters out unwanted noise. The signals are then sent to sequencing mechanism 34.

As illustrated, in a preferred embodiment, sequencing mechanism 34 comprises a plurality of J-K flip-flops arranged in a "daisy-chain" configuration. The logic outputs from sequencing mechanism 34 are illustrated as A, B, C, D, and E. If the proper vehicle function devices have been energized, in a proper sequential order, then sequencing mechanism 34 is operable to generate associated logic outputs that are in a predetermined logic "go" condition, herein defined as a logic "1". If the potential operator fails to perform the proper sequence when energizing the vehicle function devices, then the logic outputs will not be in the logic "1" or "go" condition, and the vehicle ignition cannot be engaged. In a preferred embodiment, the logic outputs are memorized or held when a vehicle function device is energized. If an improper sequence is performed, system 10 must be reset before output from sequencing mechanism 34 can be changed.

After leaving sequencing mechanism 34, logic outputs A-E are fed, as inputs, to U7, operable as gate mechanism 42, as will be more fully described below.

In the preferred embodiment, not only must the selected vehicle function devices be energized in the predetermined sequence, the sequence must be performed within a predetermined time period. Thus, an impaired potential operator, who knows the proper sequence, may be inhibited from starting the motor vehicle due to the presence of timer mechanism 38. A potential operator, whose motor skills are diminished due to excessive alcohol consumption or drug use, may not be able to properly perform the function sequence within the predetermined time period. System 10 is designed so that all signals from sequencing mechanism 34 must be in a "go" condition during the time period that a signal from timer mechanism 38 is in a "go" condition, or the vehicle ignition cannot be engaged from the "start" position. A logic "1" output from timer mechanism 38 is herein defined as the logic "go" condition.

In an initial power-up time (i.e. 10 milliseconds), all J-K flip-flops (components labeled U4, U5, U6, U12) and timer mechanism 38, component U9, are in the reset mode, due to the R-C time period caused by resistor R23 and capacitor C3.

After capacitor C3 reaches +2V, the input to timer mechanism 38, at U9-2, goes from a logic "1" to a logic "0" momentarily then back to a logic "1," due to the coupling of capacitor C4.

As soon as input pin U9-2 goes to a logic "0", it will cause output pin U9-3 to go from logic "0" to logic "1". The time frame for this output is controlled by the mathematical value of the pre-selected resistor chosen from R33–R38. In the preferred embodiment, a plurality of resistors is incorporated into system 10. It is contemplated that after a potential operator becomes competent in performing the proper vehicle function device sequence, a resistor with a different value can be pre-selected to shorten the time period for performance.

When the predetermined time period is exceeded, timer mechanism 38 goes to a logic "no-go", or "0" condition. In the preferred embodiment, the output from timer mechanism 38 cannot be changed then until system 10 is reset.

NAND Gate (U7) is operable as gate mechanism 42. Gate mechanism 42 receives the five output logic lines from sequencing mechanism 34, namely A, B, C, D, and E, and output from timer mechanism 38. Output from gate mechanism 42 will only be a logic "0" when all its input lines are logic "1". A logic "0" output from U7 is herein defined as the logic "go" condition from gate mechanism 42.

In this example, the J-K flip-flop U12 pin 14, output controls the U7-12 input. If the timer mechanism 38 times out before the potential operator performs the proper vehicle functions in sequence, then the output on pin 14 of U12 will toggle to a logic "0", as input to gate mechanism 42. However, if the proper sequence is performed before timer mechanism 42 times out, then all inputs to gate mechanism 42 will be in a logic "1" condition, the output from U7 will be logic "0".

The output from gate mechanism 42 controls the sensory indicator mechanism comprising, in this example, first LED 50 and second LED 54. When the output from gate mechanism 42 is in a logic "no-go" or "1" condition, first LED 50 is illuminated. When the output from gate mechanism 42 is in the "go" or "0" condition, second LED 54 is illuminated. Also, the output from gate mechanism 42 controls the signal that eventually passes to relay K1 via transistor Q6. A logic "0" from gate mechanism 42 is inverted at U8, to allow current through K1, to close the ignition circuit when the vehicle ignition is placed in the "start" position.

In the proto-type vehicle, the LEDs 50, 54 are mounted on the vehicle instrument panel for ready sensory indication to a potential vehicle operator. However, it is within the scope of the present invention to provide other sensory devices, such as audio tones, to alert the potential operator as to a condition of system 10.

In a preferred embodiment, a system reset occurs automatically each time the potential operator turns the ignition key back to OFF position 70 and then to run/start position 30. In the preferred embodiment, once the output from gate mechanism 42 is in the logic "go" condition, it remains in that condition until the system is reset. Thus, if the vehicle stalls, the ignition can be re-engaged, so long as the operator does not move the ignition key back to OFF position 70.

Table 1 below provides a parts list for all the discrete components mounted on the exemplary electronic printed circuit board. Exemplary mathematical values are given for all resistors and capacitors. Exemplary identities are given for the transistors, diodes, zener diodes, and IC chips. It will be appreciated by those having skill in the art that such components may be replaced with alternate components without departing from the scope of the present invention.

TABLE 1

| Identification | Value | Remarks |
| --- | --- | --- |
| R1, R2, R3, R4, R5, R34 | 82k @ 1/4 W | All Resistors Are 10% Except Those Marked With * |
| R6, R7, R8, R9, R10, R24 | 1k @ 1/4 W | |
| R11, R12, R13, R14, R15, R16, R17, R18, R19, R20, R21, R22, R25, R28, R29, R30 | 10k @ 1/4 W | |
| R26, R27 | 330 Ohm @ 1/4 W | |
| R33 | 57k @ 1/4 W | *1% |
| R34 | 82k @ 1/4 W | *1% |
| R35 | 100k @ 1/4 W | *1% |
| R36 | 120k @ 1/4 W | *1% |
| R37 | 150k @ 1/4 W | *1% |
| R38 | 330k @ 1/4 W | *1% |
| R39 | 51k @ 1/4 W | |
| R40 | 100 Ohm @ 1/4 W | |
| R41 | 3.3k @ 1/4 W | |
| R42 | 5.6k @ 1/4 W | |
| R43 | 47k @ 1/4 W | |
| C1 | 0.22 uf/50 V | Film |
| C2, C16 | 4.7 uf/35 V | Electrolytic |
| C3, C5 | 47 uF/35 V | C5 1% Tol. Electrolytic |
| C4, C12, C13, C15 | 0.01 uF/50 V | Film |
| C6, C7, C8, C9, C10, C11 | 0.01 uF/35 V | Film |
| C14 | 1.0 uF/35 V | Electrolytic |
| C17 | 100 uF/35 V | Electrolytic |
| Z1, Z2, Z3, Z4, Z5 | 6.8 V Zener @ 1 W | NTE 50714 |
| Q1, Q2, Q3, Q4, Q5, Q6, Q7 | NPN Transistor 2N2222A | NTE 123A |
| D1, D2, D4, D5 | Diode IN4148 | |
| D6 | Diode, Small Power | NTE 125 @ 2.5 amp forward |
| U1, U2, U3 | Inverter 7404 | TTL |
| U4, U5, U6, U12 | J-K Flip-Flop 7476 | TTL |
| U7 | Eight-Input NAND 7430 | TTL |

TABLE 1-continued

| Identification | Value | Remarks |
| --- | --- | --- |
| U8 | Inverter 7406 | Open Collector |
| U9 | Timer LM 555 | |
| U10 | Two Input AND 7408 | TTL |
| U11 | Voltage Regulator LM 7805 | +5 V regulated |
| U13 | Op-Amp Lm 324 | National-Quad Operational Amp |
| K1 | Contact: 10 Amp Coil Voltage: 12 VDC | Octal Base DPDT Coil Current = 143 Ma |
| K2, K3 | Contact: 2 Amp Coil Voltage: 12 VDC | Coil Resistance = 960 Ohms |
| F1 | 2a | |
| F2 | 10a | |

Description and Operation of Alternate Embodiments

It is within the scope of the present invention to replace timer mechanism 38 with other timing devices or sub-circuits. Such replacements are well known by those of skill in the art. For example, a clock chip, such as a 1 Hz clock chip (LM555) feeding a four bit binary up counter (7493) could be used with a comparator (7485). Such a proposed replacement can provide several time settings from which to choose.

In yet another embodiment, the proposed system can utilize a microprocessor chip to transfer data into a memory register. For example, the microprocessor chip can be installed in the exemplary system to replace timer mechanism 38. One function of the memory register can be to store and hold a given operator's last time (for example up to the last five times) of performing the required sequence of functions. Generally, an operator decreases the time to perform the required sequence of functions with experience. Thus, using a microprocessor chip, the MAX TIME for the given operator can be updated.

An embodiment utilizing a microprocessor chip can be utilized to gather/store/compare several operator qualities. Various embodiments of the invention are envisioned using microprocessor technology. Thus a wide range of operator data can be tracked and evaluated. For example, it is possible to provide for a plurality of authorized operators, each having a distinct performance norm. Further, tracking of vehicle movement, time of day, comparison of the time of day with difficulty operating the vehicle, etc. are within the scope of the present invention. Such operator data can be stored and/or downloaded to another computer via connection ports for a variety of uses. For example, if the disclosed system were used as part of a law enforcement program, compliance with a court order could be readily monitored.

Another embodiment of the present inventive system may utilize fewer or more than five vehicle function devices for input to the sequencing mechanism 34. Those having skill in the art could readily adapt the sequencing mechanism 34 to provide this modification.

Figure 3:
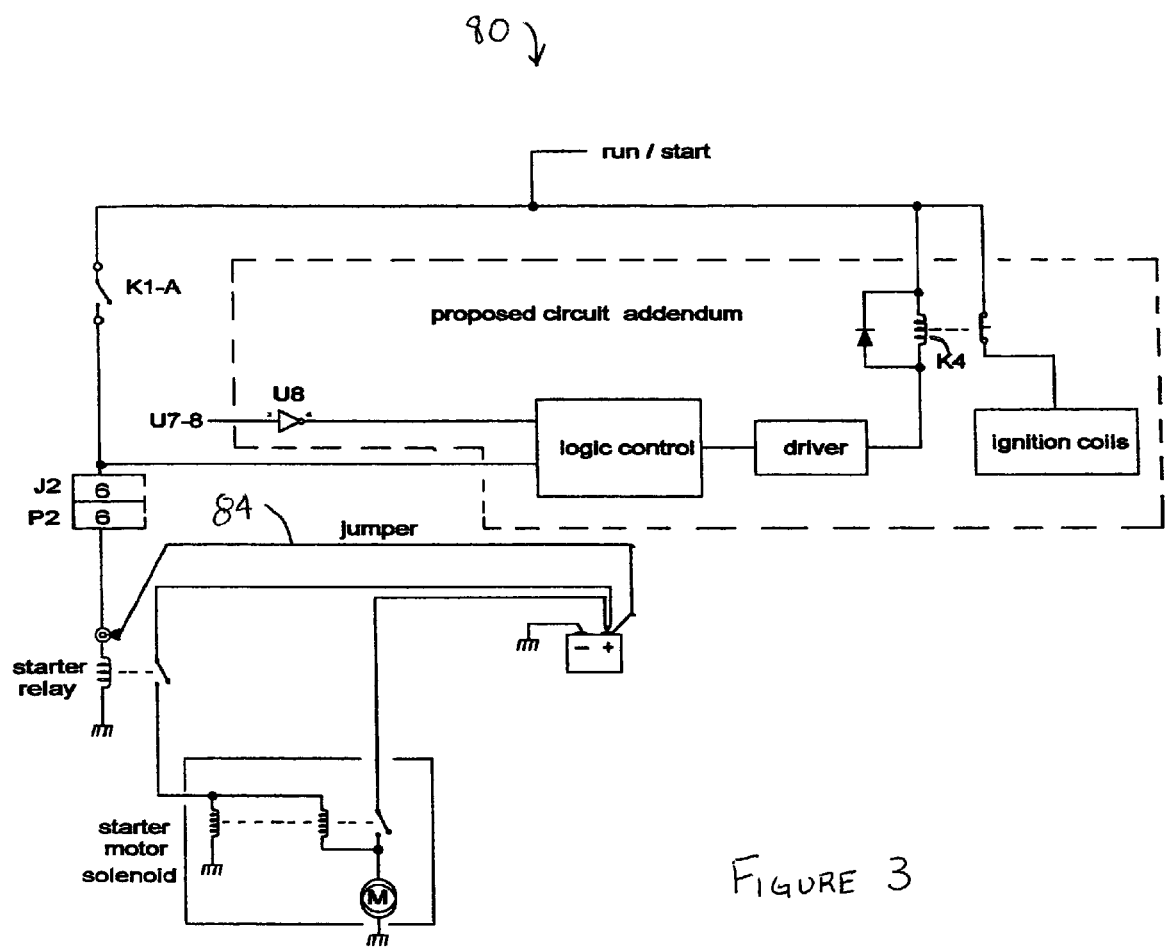
FIG. 3 shows a block diagram of an alternate embodiment of the invention having a jump inhibiting sub-circuit.

Another embodiment of the invention, illustrated in FIG. 3, provides an inhibit sub-circuit, shown generally at 80. The inhibit sub-circuit 80 is operable to prevent the system from being by-passed by jump-starting the engine. If an attempt is made to by-pass the system by the jumper connection 84, then coil K4 will break the ignition circuit. Thus the engine will turn when the ignition is in the run-start position, but the ignition will not engage.

Figure 4:
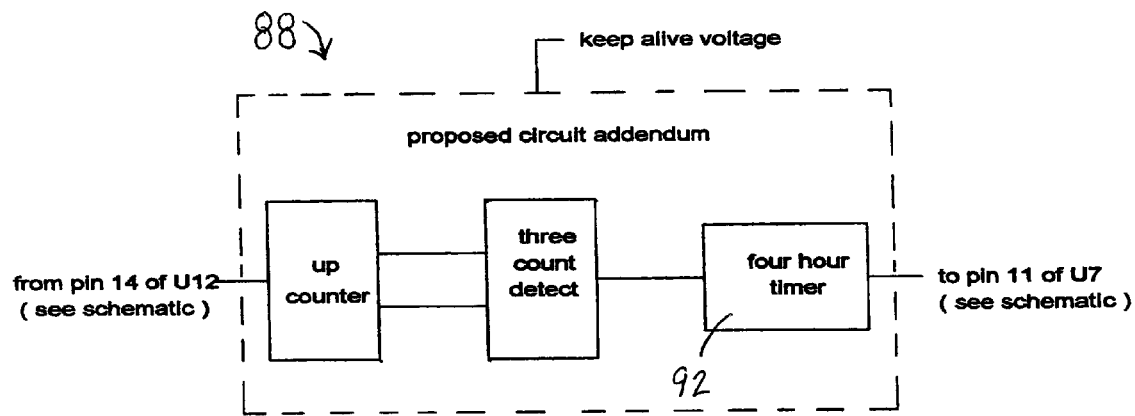
FIG. 4 shows a block diagram of an alternate embodiment of the invention having a timed shutdown sub-circuit.

Another embodiment of the invention, illustrated in FIG. 4, provides a timed shutdown sub-circuit, shown generally at 88. In this embodiment, if a potential operator attempts to start the motor vehicle, but is unable to do so after a predetermined number of attempts, long-term timer 92 will effectively delay the system reset until a predetermined time period expires. In this preferred embodiment, the time period is four hours. Those with skill in the art can readily adapt this embodiment to provide a greater or lesser time period.

Figure 5:
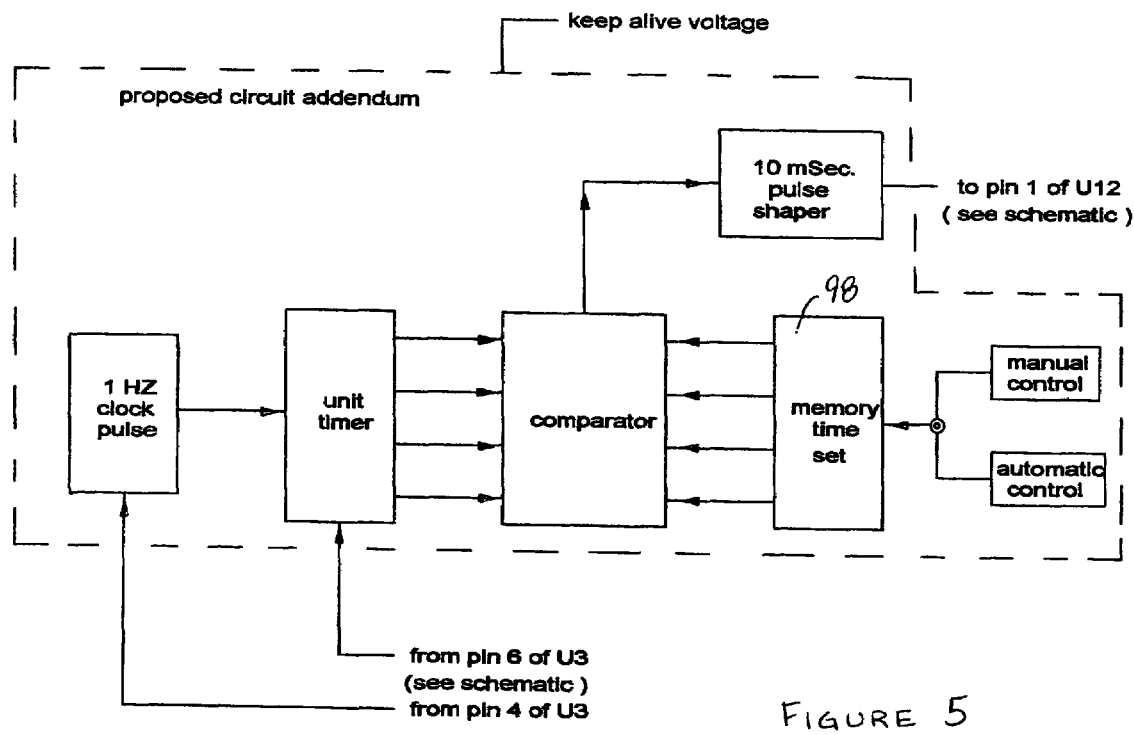
FIG. 5 shows a block diagram of an alternate embodiment of the invention having a timer update mechanism.

Yet another embodiment of the invention is illustrated in FIG. 5. In this embodiment, a pre-selected number of past performance times for an operator is held in the memory time set 98. The maximum time for performance is then updated (max. time decreases) to provide for improved time due to the operator's experience with the system.

Figure 6:
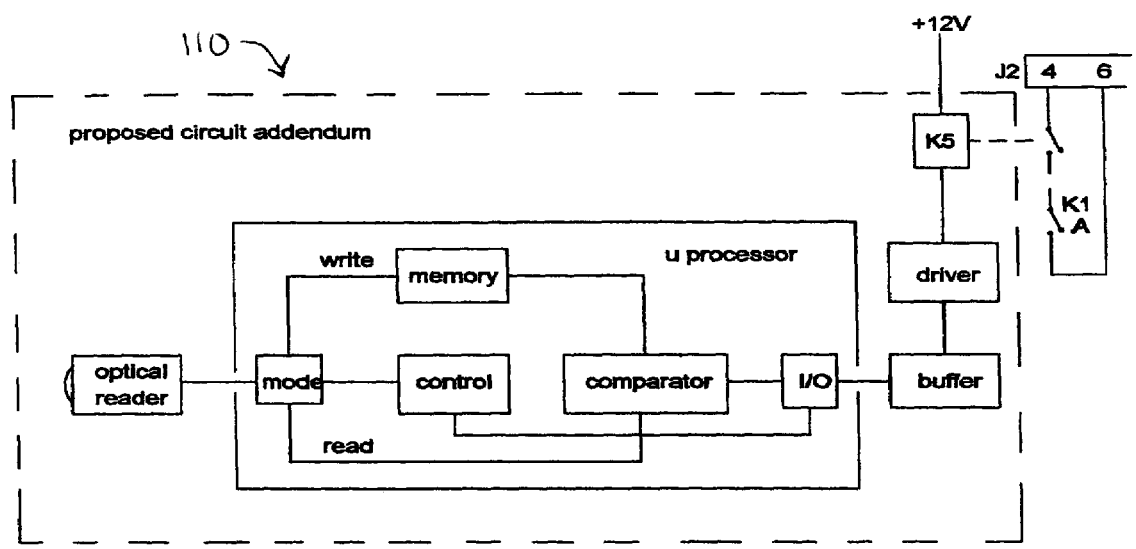
FIG. 6 shows a block diagram of an alternate embodiment of the invention having a biometric identifier mechanism.

Yet another embodiment of the invention is illustrated in FIG. 6. This embodiment includes identifier mechanism shown generally at 110 to identify an operator using a biometric identifier such as a thumbprint. If the operator is recognized by the system, the operator may proceed to perform the vehicle function device sequence within the predetermined time period in order to engage the vehicle ignition.

Conclusion, Ramifications, and Scope of Invention

It is contemplated within the scope of the invention that the vehicle can be an automobile, boat, plane, or any other vehicle involving an electrical system and vehicle function devices engaged with the electrical system.

It is contemplated within the scope of the invention to provide a system that can be coded by a vehicle owner to allow additional authorized operators. It is also contemplated that a system could be pre-coded so that a user cannot change the parameters in order to subvert the impaired driver deterrence.

Thus the new ignition system and methods of the present invention achieve the above stated objectives, eliminate difficulties encountered in the use of prior devices and systems, solve problems, and attain the desirable results described herein.

In the foregoing description certain terms have been used for brevity, clarity, and understanding. However, no unnecessary limitations are to be implied therefrom. Such terms are used for descriptive purposes and are intended to be broadly construed. Moreover, the descriptions and illustrations given are by way of examples and the invention is not limited to the exact details shown or described.

In the following claims, any feature described as a means for performing a function shall be construed as encompassing any means capable of performing the recited function, and not mere equivalents of the particular means described in the foregoing description.

Having thus described the features, discoveries and principles of the invention, the manner in which it is constructed and operated, and the advantages and useful results attained; the new and useful structures, devices, elements, arrangements, parts, combinations, systems, equipment, operations, methods, and relationships are set forth in the appended claims.

It is claimed:

1. A system for use with vehicle having a vehicle ignition circuit and a plurality of vehicle function devices comprising:
   a sequencing mechanism operable to receive logic inputs from each of a plurality of vehicle function devices when the vehicle function device is energized, the sequencing mechanism being operable to generate a plurality of function outputs, each of the function outputs being in a predetermined "go" logic condition only if each of the plurality of vehicle function devices are energized according to a predetermined sequence;
   a timing mechanism operable to selectively provide a timing output in a predetermined "go" logic condition for a predetermined time period; and,
   a gate mechanism operable to generate an ignition output responsive to each of the generated function outputs and the timing output, wherein the ignition output is in a predetermined logic "go" condition only if each of the plurality of function outputs and the timing output are in the predetermined logic "go" condition, wherein the ignition output is operable to selectively complete the vehicle ignition circuit when the ignition output is in the logic "go" condition.

2. The system of claim 1 further comprising:
   an indicator mechanism in electrical communication with the gate mechanism, the indicator mechanism being operable to selectively provide sensory output to indicate a condition of the ignition output.

3. The system of claim 1 further comprising:
   a reset mechanism operable to initialize a plurality of system mechanisms, wherein the reset mechanism is operable to respond to an electrical signal generated when the vehicle ignition is in a "run/start" position.

4. The system of claim 1 further comprising:
   a buffer mechanism in electrical communication with a vehicle electrical source, the buffer mechanism being operable to convert an initial voltage of the vehicle electrical source to a predetermined voltage useable by the system.

5. The system of claim 1 further comprising:
   a delay mechanism in electrical communication with the vehicle ignition, the delay mechanism being operable to cause a predetermined delay in an electrical signal generated when the vehicle ignition is placed in a "run/start" position.

6. The system of claim 1 further comprising:
   a buffer mechanism in electrical communication with a vehicle electrical source, the buffer mechanism being operable to convert an initial voltage of the vehicle electrical source to a predetermined voltage useable by the system; and,
   a reset mechanism operable to initialize a plurality of system mechanisms, wherein the reset mechanism is operable to respond to the electrical signal generated when the vehicle ignition in a "run/start" position.

7. The system of claim 1 wherein the sequencing mechanism comprises a plurality of J-K flip-flops connected in a daisy-chain configuration.

8. The system of claim 1 wherein the sequencing mechanism is operable to receive logic inputs from at least three vehicle function devices.

9. The system of claim 1 wherein the gate mechanism comprises a NAND logic gate.

10. The system of claim 1 wherein the predetermined "go" logic condition of the function outputs is a logic "1", the predetermined "go" logic condition of the timing mechanism is a logic "1" and the predetermined "go" logic condition of the gate mechanism is a logic "0".

11. The system of claim 2 wherein the indicator mechanism comprises a first LED and a second LED, and wherein the first LED is operable to emit light if the logic output from the gate mechanism is not in the predetermined logic "go" condition and the second LED is operable to emit light if the logic output from the gate mechanism is in the predetermined logic "go" condition.

12. A system for controlling a vehicle ignition circuit comprising:
    a gate mechanism in electrical communication with a vehicle ignition circuit, the gate mechanism being operable to selectively provide an ignition logic output in a predetermined logic "go" condition to close the vehicle ignition circuit;
    a timer mechanism operable to selectively provide a logic timer output to the gate mechanism; and,
    a sequencing mechanism in operable connection with a plurality of vehicle function devices, the sequencing mechanism being operable to selectively provide a logic function output associated with each of the vehicle function devices to the gate mechanism;
    wherein the ignition logic output from the gate mechanism to the vehicle ignition circuit is in the predetermined logic "go" condition only if the logic timer output is in a predetermined logic "go" condition and each logic function output is in a predetermined logic "go" condition.

13. The system of claim 12 wherein each logic function output is in the predetermined logic "go" condition only if each of the plurality of vehicle function devices is energized in a predetermined sequence.

14. A method for selectively controlling a vehicle ignition circuit comprising the steps of:
    providing a sequencing mechanism operable to receive logic inputs from each of a plurality of vehicle function devices and selectively generate a function logic output associated with each of the plurality of vehicle function devices;
    providing a timer mechanism operable to selectively generate a timer logic output;
    providing a gate mechanism operable to receive, as logic inputs, the function logic outputs and the timer logic output and selectively generate an ignition output; and,
    preventing the vehicle ignition circuit from closing unless the ignition output is in a predetermined logic "go" condition.

15. A method of inhibiting an unauthorized potential operator from causing a vehicle ignition circuit to close, the method comprising the steps of:
    providing a system in electrical communication with a plurality of vehicle function devices and a vehicle ignition circuit, the system being operable to prevent the vehicle ignition circuit from closing unless a potential operator causes each of the plurality of vehicle function devices to be energized, in a predetermined sequence, within a predetermined time period.

16. A system for selectively allowing engagement of a vehicle ignition having "run", "start", and "off" positions, the system being in electrical communication with a vehicle electrical system, the vehicle electrical system being operable to energize a plurality of vehicle function devices, the system comprising:
- a sequencing mechanism engaged with the plurality of vehicle function devices, wherein the sequencing mechanism is operable to receive a logic input from each of the plurality of vehicle function devices when the vehicle function device is energized, wherein the sequencing mechanism is operable to selectively generate logic outputs associated with each of the plurality of vehicle function devices, wherein each of the logic outputs are in a predetermined "go" condition only if each of the vehicle function devices are energized according to a predetermined sequence;
- a timing mechanism being operable to selectively provide a timing output, wherein the timing output is in a predetermined "go" condition for a predetermined time period;
- gate mechanism being operable to receive, as function inputs, the logic outputs associated with each of the plurality of vehicle function devices and to receive, as a timing input, the timing output from the timing mechanism, wherein the gate mechanism is operable to generate an ignition output in response to the function inputs and the timing input, wherein the ignition output allows selective engagement of the vehicle ignition in the "start" position only if each of the function inputs and the timing input are in the predetermined "go" condition; and,
- a buffer mechanism in electrical communication with a vehicle electrical source and the sequencing mechanism, the buffer mechanism being operable to convert a voltage of the vehicle electrical source to a predetermined voltage useable by the sequencing mechanism.

17. The system of claim 16 further comprising:
a reset mechanism operable to respond to an electrical signal received from a vehicle ignition in the "run/start" position, the reset mechanism being operable to initialize the logic inputs from each of the plurality of vehicle function devices to a predetermined initial condition.

18. The system of claim 17 wherein the sequencing mechanism is operable to hold the generated logic outputs until the reset mechanism subsequently initializes the logic inputs.

19. The system of claim 16 further comprising:
an indicator mechanism in electrical communication with the gate mechanism, the indicator mechanism being operable to selectively provide sensory output to indicate a condition of the ignition output.

20. A system for selectively allowing engagement of a vehicle ignition circuit having "run/start", "start", and "off" positions, the system comprising:
- a buffer mechanism in electrical communication with a vehicle electrical source, the buffer mechanism being operable to convert an initial voltage of the vehicle electrical source to a predetermined voltage useable by the system,
- a delay mechanism in electrical communication with the vehicle ignition, the delay mechanism being operable to cause a predetermined delay in an electrical signal generated when the vehicle ignition is placed in a "run/start" position;
- a reset mechanism operable to initialize a plurality of system mechanisms, wherein the reset mechanism is operable to respond to the electrical signal generated when the vehicle ignition in the "run/start" position;
- a sequencing mechanism operable to receive logic inputs from each of a plurality of vehicle function devices when the vehicle function device is energized, the sequencing mechanism being operable to generate a plurality of function outputs, each of the function outputs being in a predetermined "go" logic condition only if each of the plurality of vehicle function devices are energized according to a predetermined sequence, wherein the sequencing mechanism is in operable connection with the reset mechanism, and wherein the sequencing mechanism is operable to "hold" the generated logic outputs until a subsequent initializing of logic inputs by the reset mechanism;
- a timing mechanism operable to selectively provide a timing output in a predetermined "go" logic condition for a predetermined time period, wherein the timing mechanism is in operable connection with the reset mechanism;
- a gate mechanism operable to selectively generate an ignition output responsive to each of the generated function outputs and the timing output, wherein the ignition output is in a predetermined logic "go" condition only if each of the plurality of function outputs and the timing output are in the predetermined logic "go" condition, wherein the vehicle ignition may be engaged when placed in the "start" position only if the ignition output is in the predetermined logic "go" condition; and,
- an indicator mechanism in electrical communication with the gate mechanism, the indicator mechanism being operable to selectively provide sensory output to indicate a condition of the ignition output.

* * * * *